J. B. BARTHOLOMEW.
VEHICLE WHEEL.
APPLICATION FILED DEC. 8, 1909.
1,138,177.
Patented May 4, 1915.
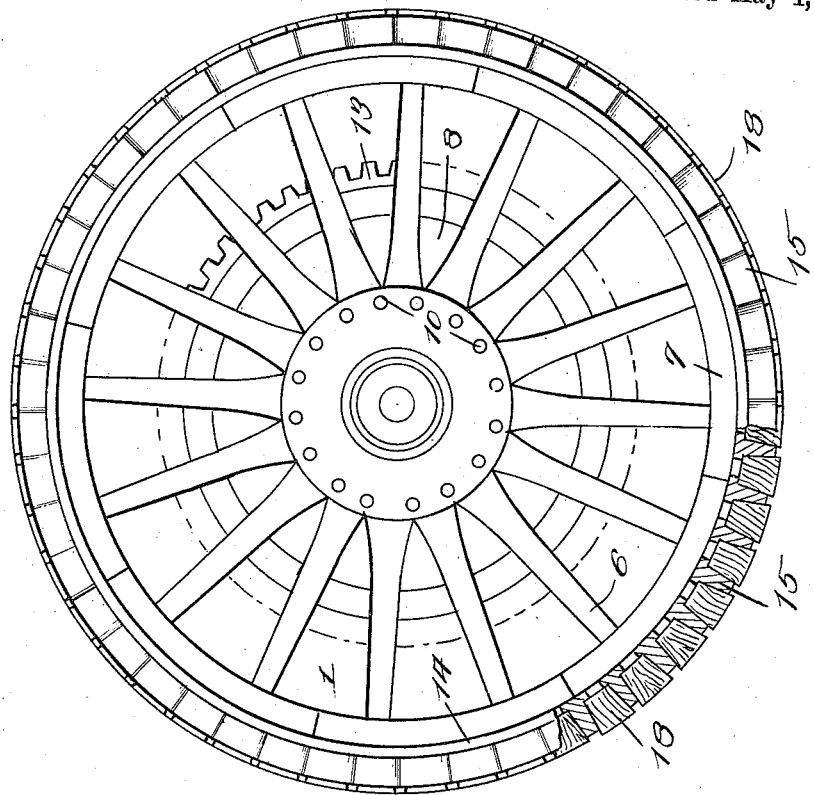
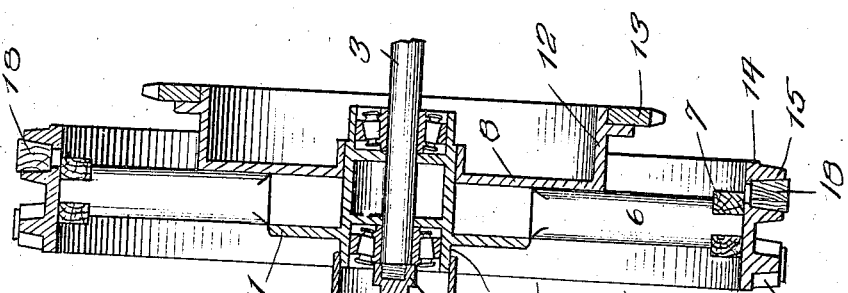
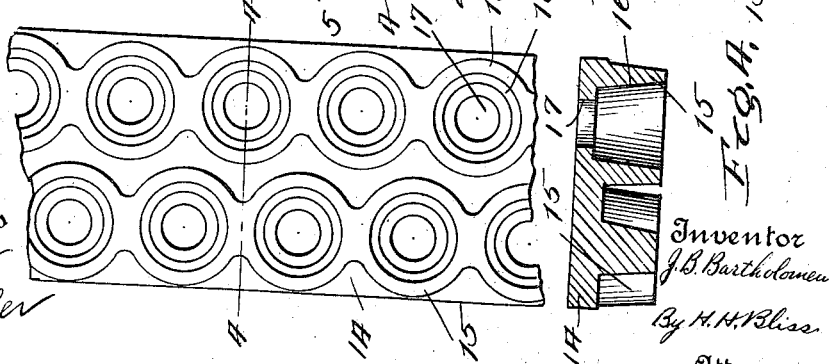
Witnesses
Inventor
J. B. Bartholomew
By H. H. Bliss
Attorney

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

VEHICLE-WHEEL.

1,138,177.      Specification of Letters Patent.      Patented May 4, 1915.

Original application filed September 22, 1909, Serial No. 519,031. Divided and this application filed December 8, 1909. Serial No. 532,086.

*To all whom it may concern:*

Be it known that I, JOHN B. BARTHOLOMEW, a citizen of the United States, residing at Peoria, in the county of Peoria and State of Illinois, have invented certain new and useful Improvements in Vehicle-Wheels, of which the following is a specification, reference being had therein to the accompanying drawing.

This invention relates to improvements in vehicle wheels.

Wheels embodying my invention are especially adapted for use as driving wheels of traction engines or automobiles. I do not desire to limit myself, however, to tractor wheels, and wheels embodying my improvements may be advantageously used as supporting and steering wheels for traction engines or automobiles, or may be used on wagons, or other vehicles which are drawn by external power.

The object of the invention is to provide a wheel of the class described which will operate noiselessly and smoothly and, at the same time, exert an effective tractive effort when operating upon either hard or soft roads.

One embodiment of my invention is shown in the accompanying drawings. I do not desire, however, to limit myself to the exact construction shown, and it will be understood that various changes in detail and in the arrangement of parts may be made within the scope of my invention.

Of the drawings—Figure 1 is an elevation of a wheel embodying my invention, a part of the rim being shown in section. Fig. 2 is a vertical cross section through the center of the wheel. Fig. 3 is an enlarged fragmentary development of the surface of the tire. Fig. 4 is a cross sectional view of the tire taken along the line 4—4 of Fig. 3.

Referring to the drawings, 1 represents the wheel as a whole.

2 is the hub of the wheel and is preferably mounted by means of a roller, or other anti-friction bearing on the stationary axle 3. The nut 4 serves to keep the wheel in place, and the guard 5 protects the axle and bearing from dust.

I prefer to construct the spokes and felly of the wheel of wood.

6—6 are the wheel spokes, and these are tapered as shown at their inner ends to engage one another and form a practically continuous ring about the hub proper. The outer ends of the spokes are doweled and inserted in the felly 7, which may be made in sections, as shown, or, if desired, in a single piece. After the felly, the spokes and the hub have been assembled, the plate 8 is placed, as shown in Fig. 1 and secured in position by means of the bolts 10 which pass through the annular flange 11 of the hub and through holes formed preferably between each pair of adjacent spokes. I find that when the wheel is to be used as a traction wheel instead of merely as a supporting wheel one very satisfactory method of driving it is to extend the plate 8 and provide it with a cylindrical flange 12, upon which is mounted a sprocket ring 13. A drive chain engages this sprocket ring and through it transmits power to the wheel from the engine or motor. The inner surface of the cylindrical flange 12 may be utilized if desired as a brake surface to engage with suitable braking devices within the flange and surrounding the axle and hub.

14 represents the tire of the wheel. This tire I prefer to form of cast steel, and it may be secured in place by shrinking or by any other usual or preferred manner. On the surface of this tire are formed rows of radially extending bosses 15. These bosses may be entirely distinct from one another but I prefer to construct them as overlapping and joining, as indicated in Fig. 3. Each of the bosses is provided with a tapering opening 16 in its center, which extends preferably to approximately the plane of the outer surface of the tire at the base of the bosses. At the bottom of each of these apertures I prefer to form a second opening 17 somewhat smaller in size and extending entirely through the tire. The bosses are preferably circular and are provided with circular apertures for the sake of cheapness and simplicity of construction. In each of the apertures 16 is driven a plug 18 which is held in place by friction. This plug is formed preferably of wood, such as hard maple, but other suitable materials, such as rubber may be used. These plugs are designed to extend out beyond the ends of the bosses 15 a suitable distance, as for instance one-half inch.

The tire may have one row of bosses, as above described. I prefer, however, to construct it with two parallel rows, and in certain cases three, or even more, rows may be found desirable. When two or more rows are used, the bosses of each row should be staggered relative to those of the next adjacent row, as shown in Fig. 3.

The plugs 18 may be readily replaced from time to time after they have become worn or broken. It will be noted that with two rows of bosses and plugs, as shown in Fig. 1, the apertures 17 extend outside of the felly, so that a suitable drift may be inserted in the apertures and the plugs driven out.

This application constitutes a division of my application entitled Traction wheels, filed September 22, 1909, Serial No. 519,031.

What I claim is:—

1. In a wheel the combination with a hub and spokes, of a felly, a tire wider than the felly and provided with a circumferential series of radial apertures larger at their outer ends than at their inner ends, the said apertures being located with parts of their inner ends extending laterally beyond the sides of the felly, and ground engaging plugs of resilient material in the said apertures, substantially as set forth.

2. In a wheel, the combination with a hub and spokes, of a felly, a tire wider than the felly and provided with a circumferential series of radial apertures, the said apertures being located with parts of their inner ends extending laterally beyond the sides of the felly, and ground engaging plugs of resilient material in the apertures, substantially as set forth.

In testimony whereof I affix my signature, in presence of two witnesses.

JOHN B. BARTHOLOMEW.

Witnesses:
A. L. GREGORY,
GEO. F. KLEIN.